US007763988B1

(12) United States Patent
Dravis

(10) Patent No.: US 7,763,988 B1
(45) Date of Patent: Jul. 27, 2010

(54) AIR TURBINE WITH RECYCLED AIR OR GEAR MECHANISM TO INCREASE INTERNAL VELOCITY FOR ENGINE POWER

(76) Inventor: Martin W. Dravis, 231 W. 96$^{th}$ St., Apartment 5-A, New York, NY (US) 10025

( * ) Notice: Subject to any disclaimer, the term of this patent is extended or adjusted under 35 U.S.C. 154(b) by 452 days.

(21) Appl. No.: 11/699,843

(22) Filed: Jan. 31, 2007

Related U.S. Application Data

(63) Continuation-in-part of application No. 11/305,864, filed on Dec. 19, 2005.

(51) Int. Cl.
*F02B 63/04* (2006.01)
*F01D 15/10* (2006.01)
(52) U.S. Cl. .......................................... 290/1 R; 290/52
(58) Field of Classification Search ................... 290/44, 290/45, 54, 1 R, 52; 416/132 B, 7; 60/398; 415/4.5, 2.1; 180/2.1, 2.2
See application file for complete search history.

(56) References Cited

U.S. PATENT DOCUMENTS

| 2,755,618 | A | * | 7/1956 | Peterson ....................... 60/598 |
| 3,228,475 | A | * | 1/1966 | Worthmann ................. 416/188 |
| 3,444,946 | A | | 5/1969 | Waterbury |
| 3,513,326 | A | * | 5/1970 | Potts ........................... 290/55 |
| 3,556,239 | A | * | 1/1971 | Spahn ........................ 180/65.2 |
| 3,813,557 | A | * | 5/1974 | Traeger ........................... 290/2 |
| 3,880,250 | A | * | 4/1975 | Emanuele ................... 180/65.3 |
| 3,904,883 | A | | 9/1975 | Horwinski |
| 4,314,160 | A | | 2/1982 | Boodman et al. |
| 5,386,146 | A | * | 1/1995 | Hickey .......................... 290/55 |
| 5,415,134 | A | * | 5/1995 | Stewart, Jr. ............... 123/41.01 |
| 5,644,170 | A | | 7/1997 | Bynum et al. |
| 6,138,781 | A | * | 10/2000 | Hakala ......................... 180/2.2 |
| 6,408,625 | B1 | * | 6/2002 | Woon et al. .................... 60/608 |
| 6,408,641 | B1 | | 6/2002 | Skur, III |
| 2004/0042901 | A1 | * | 3/2004 | Carter ......................... 416/144 |
| 2005/0103537 | A1 | * | 5/2005 | Michaud et al. .............. 180/2.2 |
| 2006/0006764 | A1 | * | 1/2006 | Ganor et al. ................. 310/328 |

\* cited by examiner

*Primary Examiner*—Julio Gonzalez
(74) *Attorney, Agent, or Firm*—Philip M. Weiss; Weiss & Weiss

(57) ABSTRACT

An air turbine power propulsion engine for use in powering a vehicle, i.e. automobile or plane, or an electrical generator. The engine is housed in a generally circular housing that features a tapered air intake end and a downstream exhaust end. Within the housing is a generator, first and second drive shafts, and at least one compressor. The at least one compressor is driven by the first drive shaft, while a series of turbine blades drive the second drive shaft which in turn drives the generator. The invention incorporates into the engine a differential gear mechanism to accelerate and compress the air that enters the engine, where the gear mechanism drives the compressor at a higher speed than the turbine blades. A second such mechanism, alone or in combination with the gear mechanism, lies in the use of an air recirculation duct works.

6 Claims, 5 Drawing Sheets

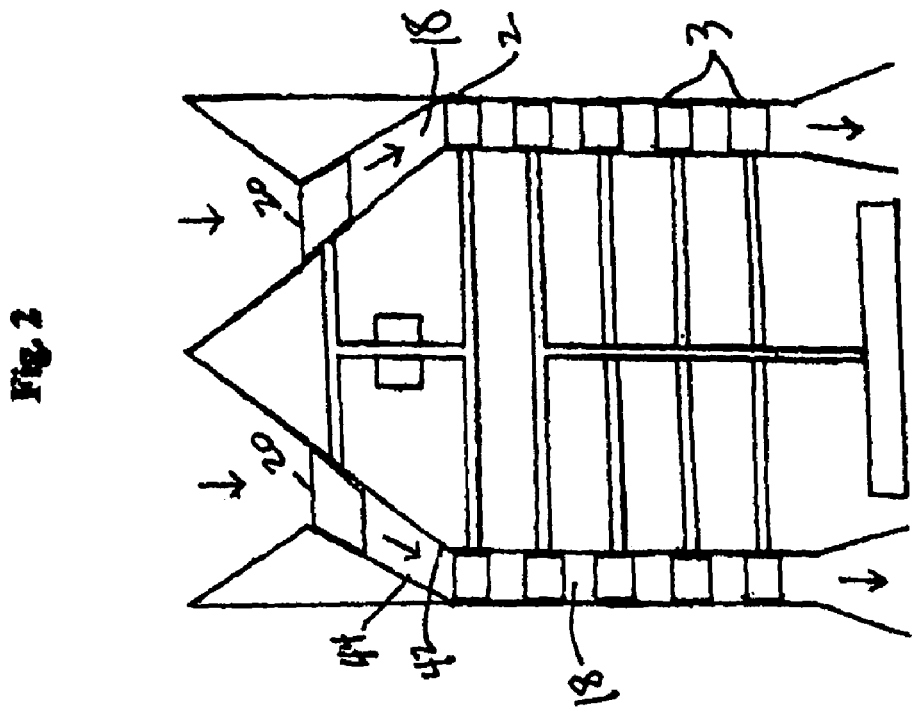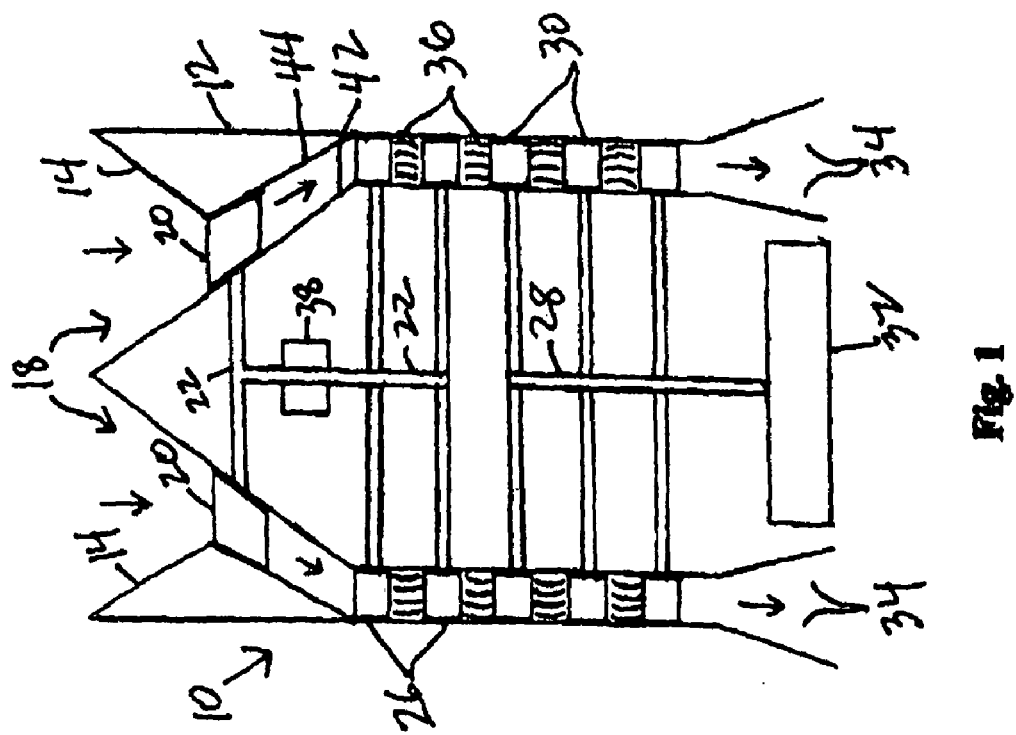

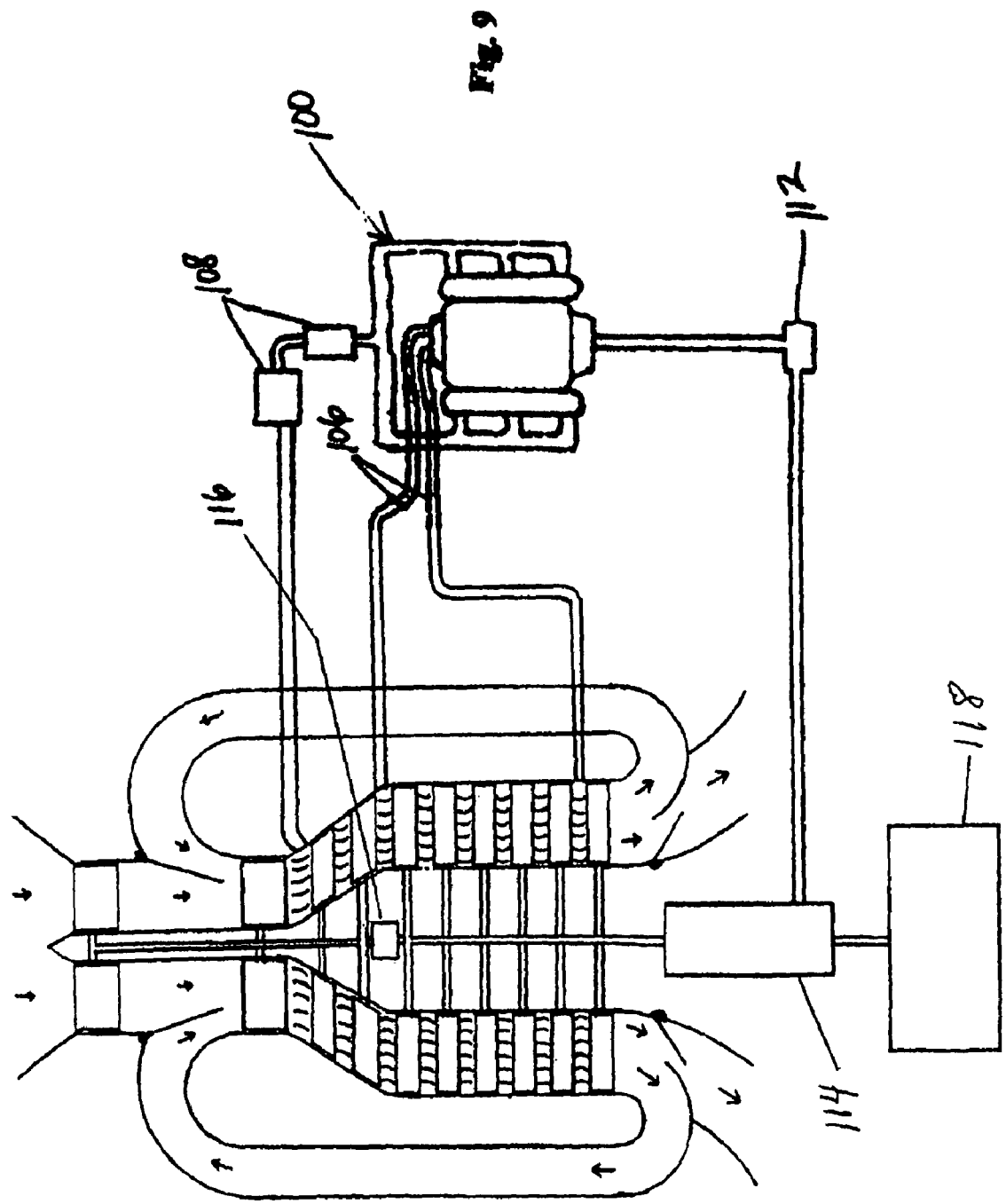

AIR TURBINE WITH RECYCLED AIR OR GEAR MECHANISM TO INCREASE INTERNAL VELOCITY FOR ENGINE POWER

RELATED APPLICATION

This application is a continuation-in-part (CIP) of Ser. No. 11/305,864, filed Dec. 19, 2005, by the inventor hereof, where the contents thereof are incorporated herein by reference in its entirety.

FIELD OF THE INVENTION

This invention is directed to the field of air turbine engine systems of the type that may be used to power a vehicle, augment the power of a vehicle, and/or drive a generator to produce electricity, more particularly to an engine system that uses multiple turbines, and/or an air recirculation mechanism to effect increased acceleration and compression of the air of the airflow within the engine.

BACKGROUND OF THE INVENTION

The present invention relates to a unique air turbine engine system for a moving vehicle, such as an automobile, truck, airplane and the like. As will become clearer hereafter, there are two enhancements of the engine according to the invention, where each enhancement, alone or together, accelerates and compresses the air that enters the air turbine engine beyond the velocity of the existing wind or relative wind.

Concerns over the environment, specifically pollution of the atmosphere, record costs of conventional fuels, and inadequate refining capacity for gasoline, have renewed interest in alternate propulsion systems for moving vehicles. However, such interest has existed for a number of years, but have not yielded significant commercial systems to meet these concerns.

The prior art offers a number of turbine systems that may be used to power vehicles. Exemplary systems are noted in the following U.S. patents:

a.) U.S. Pat. No. 6,408,641, to Skur, III, teaches a hybrid turbine coolant system where air is extracted from a pressurized air source. An air-to-air heat exchanger receives and cools the extracted pressurized air. Further, an expansion turbine receives at least a portion of the cooled pressurized air from the air-to-air heat exchanger and expands the cooled pressurized air into chilled air while extracting work. An air-to-coolant heat exchanger receives the chilled air from the expansion turbine which is used to chill refrigerant coolant. The air-to-air heat exchanger also receives the chilled air reclaimed from the air-to-coolant heat exchanger, subsequent to chilling the refrigerant coolant, to cool the air extracted from the pressurized air source.

b.) U.S. Pat. No. 5,644,170, to Bynum et al., relates to an atmospheric/aqua turbine is an apparatus for producing energy by allowing air or water to be metered by controls through an adjustable air or water scoop into twin turbines to produce electricity when the atmospheric/aqua turbine is installed on vehicle or a boat. The turbine is effective for a vehicle traveling at 30 mph or more, and in the case of a boat traveling at 8 to 10 mph or more.

c.) U.S. Pat. No. 4,314,160, to Boodman et al., is directed to a system to provide additional electrical power in an electrically powered vehicle. An air scoop is mounted on the vehicle. The air scoop opens in a generally forward direction. A turbine wheel is mounted in the rear of the air scoop. An electric generator is connected to the turbine wheel, whereby air passing through the air scoop will generate additional electricity for the vehicle batteries. The air scoop is rotatable and means are provided to lock it in position.

d.) U.S. Pat. No. 3,904,883, to Horwinski, discloses a unit for supplying power with the least possible local pollution to the environment, where the unit comprises both a prime mover with the fuel supply and also significantly large storage means for electric energy. The unit involves basically a dynamo-electric machine with a commutator-type armature and salient-field type rotator surrounding and rotatably carrying the armature. The rotator is turnable and has sets of slip rings at its ends, for effecting electrical connections to the salient fields and also to brush holders which carry brushes bearing on the commutator. One opposite set of field pole windings is series connected and utilized as a series motor field winding, being connected with one set of brushes whereby the machine can operate as a series motor. Another set of field pole windings is adapted to function as a shunt generator field, the generator function involving a second set of brushes. All the said brushes bear on the same commutator. The armature shaft is coupled to drive a load which could for example be vehicle wheels or else a load of a stationary installation; and the rotary field structure or rotator is coupled to be driven by the prime mover which could be a gasoline engine, steam engine etc. Storage batteries are connected to drive the dynamo-electric machine as a series motor, such as for propelling a vehicle, and can be recharged by the shunt generator portion of the dynamo-electric machine when the armature of the latter is being driven by the prime mover or gasoline engine. Suitable automatic electronic controls can be provided to determine the various modes of functioning of the prime mover and dynamo-electric machine.

e.) U.S. Pat. No. 3,556,239, to Spahn, covers a battery powered automobile includes an air operated turbine fed by front and side air scoops for providing both charging current to the batteries and driving power for the automobile. An auxiliary internal combustion engine is included for use when necessary. Deceleration and wind sensitive controls operate door structure on the front air scoop so that it opens, increasing drag, only under predetermined conditions. Braking energy is utilized to help charge the batteries.

f.) U.S. Pat. No. 3,444,946, to Waterbury, relates to an electric motor driven vehicle having at least one electric motor to supply power to said vehicle. The driving system further includes the a mechanism associated with each electric motor to supply electric power thereto comprising batteries arranged in series, and either a solar cell supplying energy to the batteries, a power-generating means with paddle wheel and Venturi tube or both adapted to supply power to the batteries. The above combination may be used either alone or in conjunction with a conventional internal combustion engine.

These prior art systems, though offering supplemental propulsion mechanisms for moving vehicles, fail to offer the efficiency needed to effect an alternative and supplemental mechanism for new vehicles and for retrofitting to existing vehicles in the manner of the present invention, nor to provide a mechanism to accelerate and compress the air that enters the air turbine engine. The manner by which the present invention achieves the goals hereof will become more apparent from the following description and accompanying drawings.

SUMMARY OF THE INVENTION

The parent invention teaches a primary or an auxiliary power system for a vehicle selected from the class of automobiles, trucks, boats, airplanes, and the like. The present invention teaches two systems to improve or enhance the performance of an air turbine engine, specifically to accelerate and/or compress the air that enters the air turbine engine beyond the existing wind or relative wind. A first such improvement to accomplish this increased acceleration and compression lies in the use of a gear mechanism to drive the turbine's compressor at a higher speed, whereby to increase the velocity of the air. The second such improvement lies in the use of an air recirculation system, where the improvements may be used separately or in conjunction with one another.

Accordingly, a feature of this invention lies in its use of a gear mechanism to enhance the performance of an air turbine engine.

Another feature hereof lies in the use of an air recirculation mechanism, alone or in combination with a gear mechanism, to accelerate and compress the air that enters the air turbine engine to increase the efficiency of the engine.

These and other features of this invention will become more apparent from the following description and accompanying drawings.

BRIEF DESCRIPTION OF DRAWINGS

FIGS. 1 and 2 are two simplified sectional and schematic views of an air turbine engine incorporating a gear mechanism to accelerate and compress air entering the engine, where the respective Figures are distinguished by the incorporation of turbine guide vanes in the engine of FIG. 1 and not in FIG. 2 according to the present invention.

FIG. 9 is a simplified sectional and schematic view of an air turbine engine according to this invention that includes an internal combustion engine or a comparable combusting engine to initiate rotation of the compressor(s).

DETAILED DESCRIPTION OF THE PREFERRED EMBODIMENTS

Figure 4:
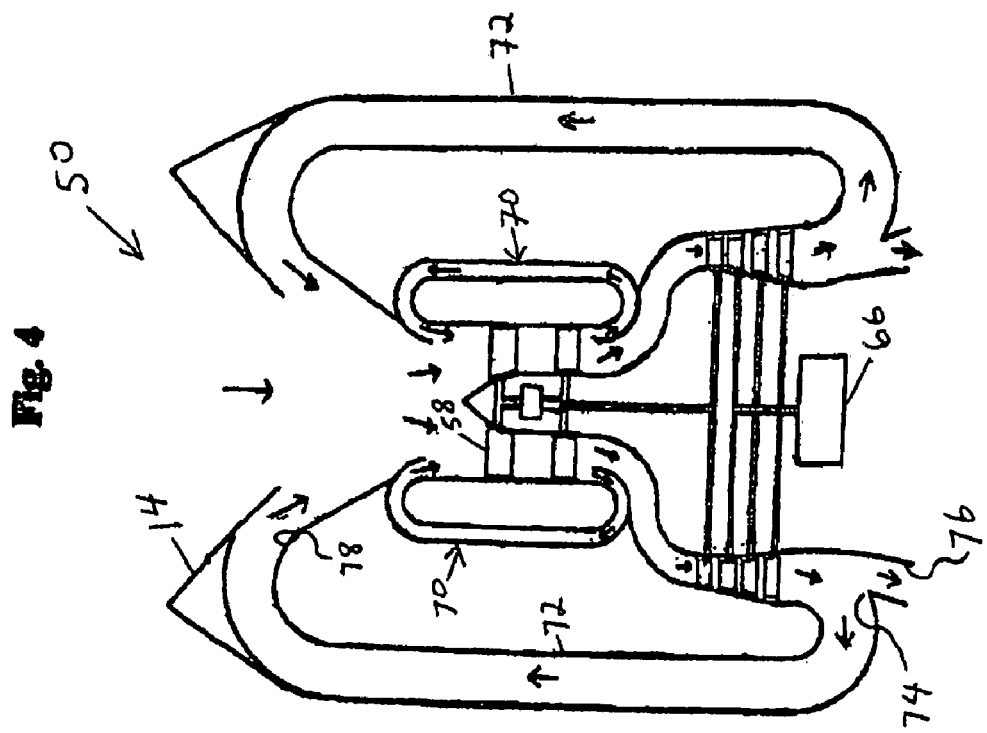
FIGS. 3 through 7 are simplified sectional and schematic views of various air turbine engines employing different air recirculation configurations for accelerating and compressing the air entering the air turbine engines according to the invention.

This invention represents, improvements over the parent application and is directed to two enhancements to increase performance of air turbine engines by accelerating and compressing the air that enters the air turbine engine. A first embodiment or enhancement incorporates a gear mechanism to increase the acceleration and compression. A second embodiment or enhancement lies in the use of an air recirculation mechanism, where the respective enhancements may be employed alone or in combination.

The system of the parent invention, especially when coupled with the enhancements hereof, is different from a standard jet engine or gas turbine engine in that it will not burn the compressed air. It is also different from other air turbines in that it employs a compressor(s) to actively accelerate and compress the air, where other versions of air turbines do not compress the air or they simply rely on the Bernoulli Effect to passively accelerate and compress the air. The compressors can be used either in conjunction with a funnel of decreasing size, taking advantage of the Bernoulli Effect, or it can be used without a passive compression/acceleration device. In either case the use of compressors, with a gear mechanism or air recirculation mechanism, will greatly amplify the potential energy of any existing wind, or relative wind created by the motion of the vehicle.

Turning now to FIGS. 1 and 2, the first enhancement to improve performance of an air turbine engine, where the Figures illustrate an air turbine engine 10 comprising a generally circular housing 12, shown in section, with an inwardly tapered forward end 14, a centrally, outwardly tapered nose 16 which together define a circular air channel 18, and a compressor 20 within the air channel 18. The engine 10 further includes a first drive shaft 22, a compressor 20, and rotating turbines blades 26 to drive the compressor 20. Additionally, the engine includes a second drive shaft 28 to transmit power from the turbine blades 30 to the generator 32. Further, the air exhausts through outlets 34, as known in the art. As seen in FIG. 1, the engine 10 may optionally include turbine guide vanes 36 between the series of blades 26, 30. An important feature of this enhancement lies in the use of a gear mechanism 38. Specifically, as will be apparent later, this enhancement is intended to drive the compressor 20 at a higher speed by the use of multiple turbines to drive the compressor 20, see FIG. 1. This is accomplished by the incorporation of the gear mechanism 38 that will combine the power produced by multiple turbines to drive the compressor 20 at higher speeds relative to each turbine. That is, it will amplify the power that can be extracted from the high velocity air by subsequent turbines.

An alternate system for the gear mechanism to drive the compressor 20 at a higher speed is shown in FIG. 2. This operates through the use of an air passage of increasing diameter between the compressor 20 and the turbine blades 26 employed to drive the compressor 20. The air passage or duct 18 consists of inner and outer walls 42, 44 respectively, both with increasing diameters between the compressor 20 and the turbine blades 26, while maintaining essentially the same volume of air. This arrangement makes possible the use of turbine blades with a greater diameter, and hence moment arm, than the compressor 20. The greater moment arm of the turbine, coupled with the gear mechanism, enables the turbine to drive the compressor at a higher rotational speed than the turbine that powers it.

Continuing with this alternate system, the air passage can be a basic donut shape, with the outer wall diameter increasing from the compressor to the turbine blade, while simultaneously the inner wall diameter increases at a greater rate in order to maintain the same air volume and therefore velocity and compression of the air. The inner diameter is measured at the root of the respective compressor or turbine blades 26, 30. This inner diameter is specifically defined by an inner wall that contains the airflow in the desired space. The outer diameter is similarly defined by the outer wall near the air turbine blades 30 where the drive shafts and gears are located.

The airflow passage will maintain the velocity and pressure of the air directed to the turbine. However, since the diameter of the turbine is greater than the compressor, the turbine will have a greater moment arm than the compressor due to its increased diameter. This greater moment arm of the turbine will produce a greater torque coefficient than is required by the compressor and therefore a higher tip speed of the turbine blade. That is, the drive shaft powering the compressor from the turbine can employ a differential gear resulting in a higher rotational speed for the compressor relative to the turbine. This increased rotational speed of the compressor will further increase the velocity and compression of the air driven by the compressor. This will in turn increase the velocity and/or pressure of the air in the turbine above the velocity of the wind or relative wind that is entering the air turbine engine. The critical feature of the differential gear lies in the use of an enclosed air passage connecting a turbine with a greater diameter than the associated compressor, enabling the use of a gear to drive said compressor at a higher rotational speed relative to the turbine.

Figure 3:
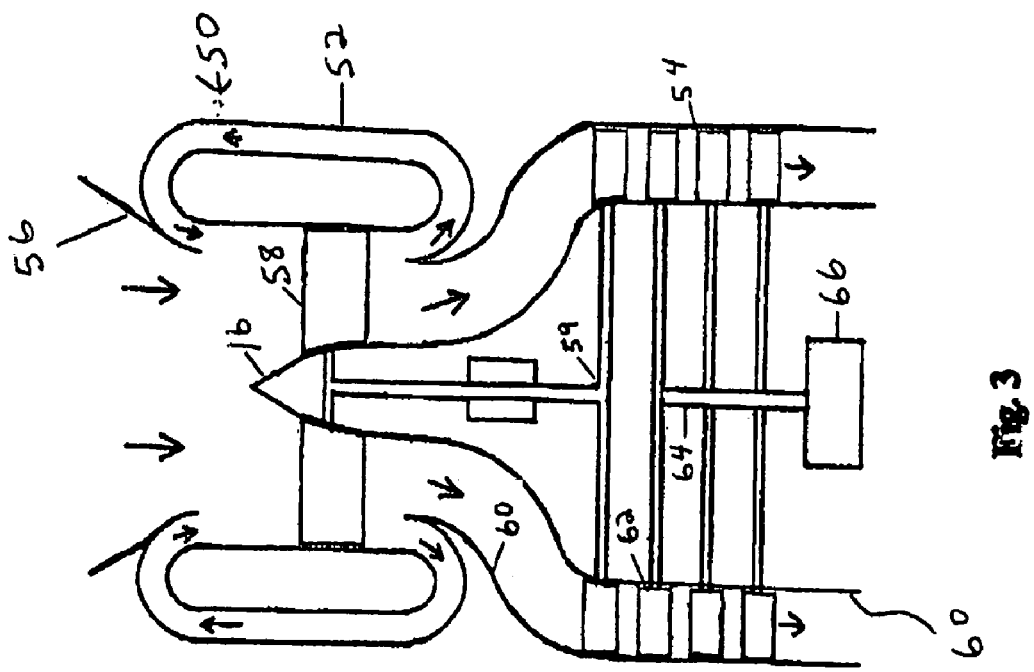

FIGS. 3 through 7 are sectional views of an air turbine engine 50 illustrating various configurations of an air recirculation system for increasing the velocity and pressure of the air for an air turbine engine 50 according to this invention. FIG. 3, a first air recirculation system, recirculates air through a generally circular duct 52 only in the compressor section. Like the previous embodiment, the air turbine engine 50, contained within a generally circular housing 54, comprises an inwardly tapered, air intake end 56, a compressor 58 driven by a drive shaft 59, and an air exhaust duct channel 60 passing through a plurality of turbine blades 62 driving the shaft 64, which in turn transmits power to a generator 66. In this system a portion of the intake air travels through the exhaust duct channel 60 while the remaining air is recirculated through the circular duct 52 to be combined with fresh intake air. This increases the pressure and velocity in the compressor section. Though similar to air recirculation mechanisms on gas turbine engines, here the primary function is to increase the velocity of the air in the air turbine engine. Further, a key difference herein, over that of the gas turbine engine, is that the compressed air is not subsequently combusted. This system will build up pressure and velocity of the air prior to the induction of the air into the turbine section. The air is then directly induced into the turbine section which extracts mechanical energy from the air.

Figure 6:
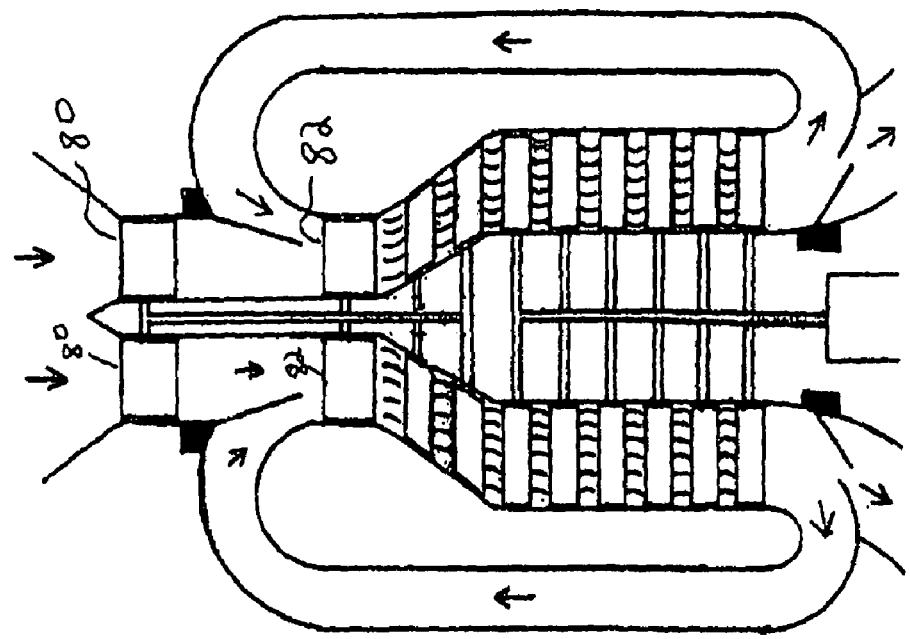

Since in an air turbine engine the air that passes through it is not combusted, it may be preferred to recirculate the air after it passes through the turbine section, or at least a portion thereof. FIGS. 4 and 6 illustrate two versions of this modified system. Specifically, FIG. 4 shows a dual recirculation configuration with a first inner duct works 70, similar to FIG. 3, and a second outer duct works 72, where said second outer duct works draws a portion of the air from the turbine section through the entry port 74, the remainder being exhausted through outlet channel 76, whereupon the recirculated air is transmitted back through the inlet port 78 into the compressor section. FIG. 6 illustrates a configuration similar to said second outer duct works 72 of FIG. 4, except that the recirculated air is transmitted back to the intake channel between first and second compressor sections 80, 82. In the respective Figures, the air that passes out of the air turbine through the inner or outer duct works back to the intake has already powered one, some, or all of the turbines prior to circulating back into the compressor inlet. The recirculated air still has velocity and pressure after passing through the turbine section. That is, this air is added to the air in the compressor section increasing the total velocity and pressure of the air in the compressor section.

Unlike air recirculation systems that just recirculate air in the compression section, these recirculation systems (FIGS. 4 and 6) has the advantage that the air drives the turbine(s) powering the compressor, prior to recirculating the air back into the intake. This increases compressor RPM and air velocity in the air turbine engine. The increased rotational speed of the compressor also creates increased suction in both the intake duct and the recirculation duct, while simultaneously decreasing the pressure in the exhaust duct aft of the turbines. All of these effects increase the overall velocity and pressure of the air in the air turbine. This increases rotational speed of the turbines, both the one(s) dedicated to driving the compressor(s) and the one(s) dedicated to driving the generators or powering a vehicle. The higher rotational speed of the turbines subsequently increases the amount of mechanical energy generated by the air turbine.

FIG. 4 shows another version of recirculating the air. Specifically, air is recirculated from the exhaust duct back into the duct upstream of the turbine used to drive the compressor. In other words, air is circulated only in the turbine section and not in the compressor section. This increases velocity and pressure in the turbine section above the pressure and velocity in the compression section.

Figure 5:
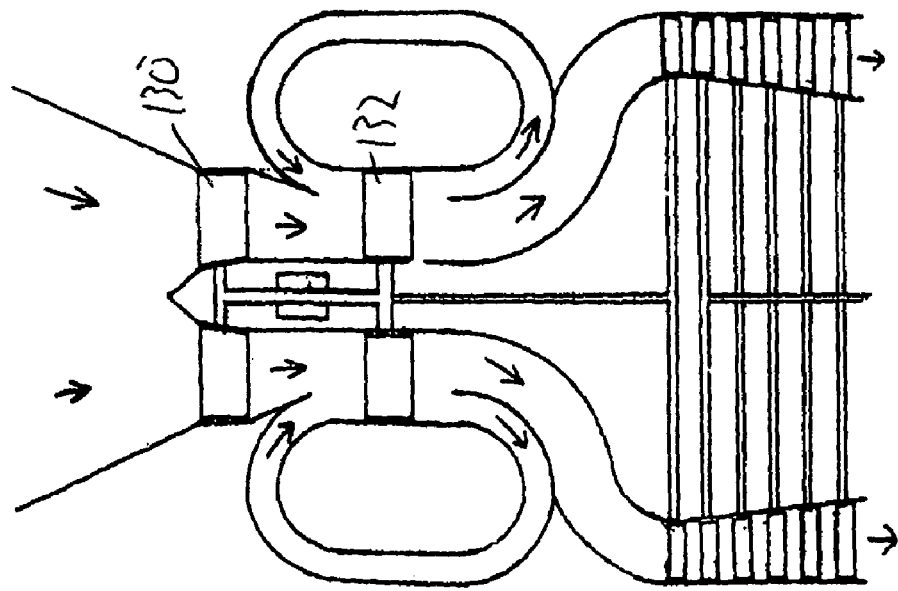

FIG. 5 shows a modified version of FIG. 3, showing 2 compressors 130 and 132 wherein a portion of air aft of compressor 132 is recirculated between compressor 130 and compressor 132.

Figure 7:
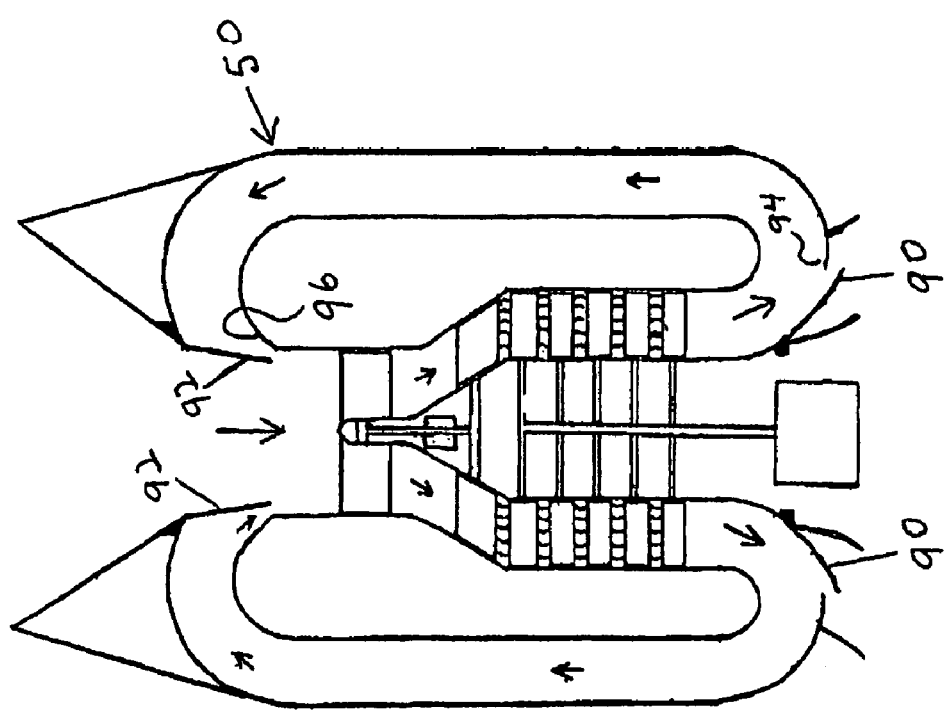

FIG. 7 illustrates one mechanism for altering the ratio of recirculated air to ambient air utilized in the air turbine engine 50 of the invention. FIGS. 3 through 6 show systems where a fixed percentage of air that is recirculated. However, in engine systems where variations are desired, valves 90, 92 may be employed at the exit outlet 94 of the recirculated air, and at the inlet end 96 for the recirculated air. That is, these valves can regulate and vary the amount of recirculated air to maintain the desired power of the turbine engine, see FIG. 7. Such valves, whether one or both, can be used with the different versions illustrated in FIGS. 3 through 6. The use of one or two valves 90, 92, and its usefulness in an air turbine engine of this invention, will depend in part on the type of vehicle, i.e. automobile or plane, that will incorporate the engine. That is, in this mechanism the exhaust valve 90 outflow controls the amount of air that recirculates. However, valve 92 may be employed to regulate the volume of air from the recirculation duct works verses the volume of ambient air entering the engine. As the velocity of air inside the engine increases, the volume or recirculated air introduced into the intake can be increased relative to the volume of ambient air, which is subsequently reduced. This can control the velocity of the air drawn into the engine, limiting it to that of the prevailing wind if desired. In this instance, the intake recirculation value can also play a role in limiting the speed of the engine. This method will reduce safety hazards from excessive intake and exhaust airspeeds. It can also maintain engine speeds during times of low intake air velocities. This type of recirculation system is best suited to an application requiring a high amount of power, without producing a very large increase in the velocity of the intake air. In an application where high velocity intake and exhaust is desirable, multiple compressors can be employed in sequence, the first one drawing in only ambient air, with one or more of the subsequent compressors utilizing a recirculation system. Finally, in low or no wind conditions, a starter motor 94 may be incorporated into the gear mechanism to initiate rotation of the compressor until sufficient wind or relative wind is achieved, whereby the motor will shut off.

Figure 8:
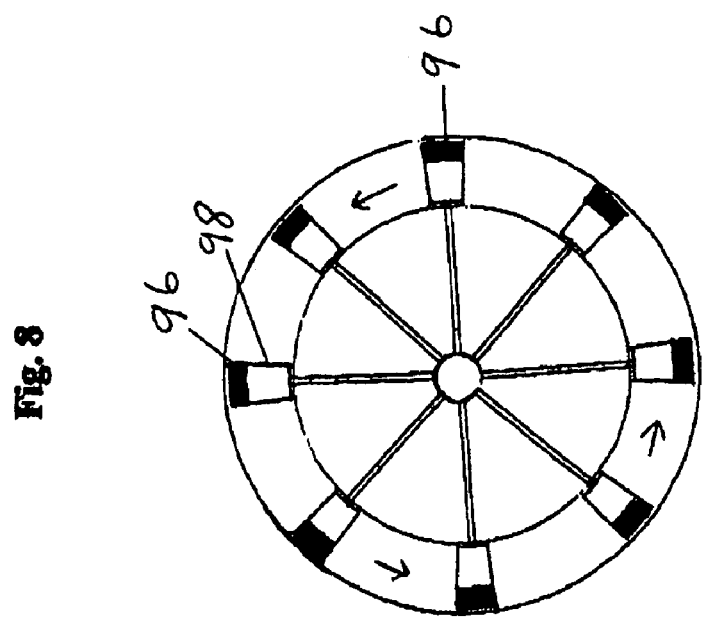
FIG. 8 is a simplified transverse sectional and schematic view of an air turbine engine showing weighted turbine blade tips to increase the centrifugal force of the turbine blades, whereby to increase the amount of energy the engine produces.

In certain applications, where the turbine blades will operate at a relatively low RPM, the centrifugal force of the turbine blades can be increased by making the tip 96 (FIG. 8) of the turbine blade 98 relatively heavier than its respective root or inner portion. In gas turbines, turbine blades are sometimes weighted in an opposite manner, namely, the tip is lighter than the root. This is done in order to reduce centrifugal force due to the excessive stress that would be caused by such centrifugal forces at very high RPM generated in the gas turbines. Certain versions of air turbines will operate at a significantly lower RPM. Therefore, centrifugal forces can be manageable and actually increase the power generated by the turbine. Rather than minimizing those forces, they can be increased. The increase weight on the tip 96 of the turbine blade 98 will increase the amount of mechanical energy it produces as; force=mass (acceleration). There are several ways to accomplish this, first, the outer edge of the turbine blade 98 can be constructed of a heavier, denser material, relative to the inner portion, which would then be construction of lighter material. This construction would leave the outer portion relatively heavier. A second method would be to fill the outer portion of turbine blade 98 with a material heavier than the turbine of which it is constructed, such as lead. A third method would be to make the inner portion of the turbine hollow, leaving the other portion relatively heavier. Turbine centrifugal weighting is not restricted to the process of the weighting, but the general result, namely the tip of the turbine is heavier and denser than the root of the turbine blade.

FIG. 9 illustrates a further modification to the air turbine engine of the invention. Applications the require a primary engine for continuous or on demand power, such as aircraft, can be powered by a hybrid form of this engine. This hybrid form consists of an advanced version of the air turbine engine, including the differential gear system and/or the air recirculation system, as discussed above. This advanced version is used in conjunction with an internal combustion engine 100 or some other combusting engine. One or more combusting engines 100 may be employed to rotate the compressor or compressors 102. This can be done mechanically through a drive shaft. It can also be accomplished electrically, by operating a generator 108 with the combusting engine and subsequently powering the compressor(s) with an electric motor. In both versions, after the airflow has started, the power from a portion of the turbines is used in conjunction with the combusting engine. Again, subsequent turbines produce mechanical energy that can be used to operate generators to produce electricity, or operate machinery.

The employment of the air recirculation system and the differential gears, FIGS. 1 through 7, will increase the compressor's output well beyond what the combusting engine will provide. This will in turn produce very high turbine rotational speeds, producing far greater power than the internal combustion engine will produce by itself. This effect can be further amplified by utilizing heat transfer from the combusting engine's cooling water, via lines 106, within the air turbine. The hot water from the combusting engine is piped through the walls, stator vanes, and turbine guide vanes to transfer heat from the water into the air turbine in areas where the extra heat will increase the power of the air turbine, while cooling the water to protect the engine. This utilizes energy normally wasted by combusting engines. Likewise, the exhaust air through exhaust 108 can be utilized. After exiting the engine and passing through pollution and noise reducing devices, the exhaust is ducted into the turbine 110 section of the engine, further increasing the pressure, heat, and velocity. This again will increase the rotational speed of the turbines, increasing the output of the air turbine engine.

FIG. 9 depicts the combination of a combusting engine 100 with the version of an air turbine shown in FIG. 6, by way of example. In this version, the internal combustion engine 100, powers the compressors through drive shaft 112, transmission/power distribution system 114, and transmission 116. After the airflow has increased, the power from the turbines combines with the power from the combusting engine to drive the compressors faster, subsequently increasing airflow. This increased airflow drives the subsequent turbines, which drive the generator 118, through transmission/power distributor 114. This modified version employs a liquid coolant system 106, that transfers heat from the internal combustion engine into the turbine section of the air turbine, increasing the amount of energy that can be extracted by the turbines while providing the necessary cooling for the internal combustion engine. In versions that generate high turbine section temperatures, the coolant can be routed through the intake or compression section, with the same effect.

This version also employs an exhaust system 108 that vents the exhaust gasses from the internal combustion engine into the turbine section of the air turbine to further increase the pressure and speed of the air and subsequently the rotational speed of the turbines. This exhaust system employs a standard pollution and noise reduce devices.

The type of hybrid air turbine combusting engine would be well suited for use in conjunction with an electric jet engine version of this invention. In this application, the hybrid provides electrical power to drive the electric jet engine. The electric jet version then produces a high-pressure air stream. In this instance, the exhaust and/or the water heat exchanger could be employed in the jet version, rather than the hybrid version. The use of a hybrid version, combined with an electric jet engine version of this invention, would dramatically reduced both the fuel consumption and pollution of aircraft.

It is recognized that changes, variations and modifications may be made to the air turbine engine of this invention without departing from the spirit and scope thereof. Accordingly, no limitation is intended to be imposed thereon except as set forth in the accompanying claims.

I claim:

1. An air turbine power propulsion engine for use in powering a vehicle or generator, said air power propulsion engine comprising:
   a housing having an air intake end and an air exhaust end, a generator, first and second drive shafts, at least one compressor, said at least one compressor driving said first drive shaft, plural turbine blades to drive said second drive shaft, which in turn powers said generator, and a differential gear mechanism connected to said first drive shaft to increase its speed to effect a great acceleration and compression of the air that enters said intake end, said engine further including an auxiliary internal combustion engine to initially rotate said generator and provide additional power to said power propulsion engine, and a water cooling mechanism having piping means to transmit heated water to heat the air and increase the output of said power propulsion engine;
   wherein said internal combustion engine includes an exhaust mechanism to vent gases therefrom, said exhaust mechanism transmitting said gases to said turbine of said engine increasing the pressure and speed of the air.

2. The air turbine power propulsion engine according to claim 1, wherein said differential gear mechanism comprises inner and outer walls from said at least one compressor directing intake air to at least one turbine blade driving said first drive shaft, wherein said walls are defined by changing diameters to maintain the velocity of air delivered to said at least one turbine blade.

3. An air turbine power propulsion engine for use in powering a vehicle or generator, said air power propulsion engine comprising:
   a housing having an air intake end and an air exhaust end, a generator, first and second drive shafts, at least one compressor, said at least one compressor driving said first drive shaft, plural turbine blades to drive said second drive shaft, which in turn powers said generator, and a differential gear mechanism connected to said first drive shaft to increase its speed to effect a great acceleration and compression of the air that enters said intake end, said engine further including an auxiliary internal combustion engine to initially rotate said generator and provide additional power to said power propulsion engine, and a water cooling mechanism having piping means to transmit heated water to heat the air and increase the output of said power propulsion engine;

said propulsion engine including an air recirculating mechanism directing a portion of the air downstream of said at least one compressor to accelerate and compress air in the engine;

wherein said air recirculation mechanism includes duct works, said duct works having an air entry end downstream from said at least one compressor and an exit end upstream from said at least one compressor.

4. The air turbine power propulsion engine according to claim 3, including a second air recirculation mechanism comprising a generally circular, second duct works, said second duct works having an air entry end downstream from said plural turbine blades driving said second drive shaft and an exit end upstream from said at least one compressor.

5. The air turbine power propulsion engine according to claim 3, wherein at least one of said air entry end and said air exit end includes a valve operable to regulate the ratio of fresh air and recycled air used within the engine.

6. The air turbine power propulsion engine according to claim 5, wherein both said air entry and said air exit ends include valves.

\* \* \* \* \*